(12) United States Patent
Kim et al.

(10) Patent No.: US 11,888,543 B2
(45) Date of Patent: Jan. 30, 2024

(54) METHOD AND DEVICE FOR ANALYZING PERFORMANCE DEGRADATION OF CELL IN WIRELESS COMMUNICATION SYSTEM

(71) Applicant: Samsung Electronics Co., Ltd., Suwon-si (KR)

(72) Inventors: Wontai Kim, Suwon-si (KR); Sunghyun Kim, Suwon-si (KR); Hyunwoo Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 17/422,594

(22) PCT Filed: Jan. 15, 2020

(86) PCT No.: PCT/KR2020/000746
§ 371 (c)(1),
(2) Date: Jul. 13, 2021

(87) PCT Pub. No.: WO2020/149642
PCT Pub. Date: Jul. 23, 2020

(65) Prior Publication Data
US 2021/0391934 A1  Dec. 16, 2021

(30) Foreign Application Priority Data
Jan. 15, 2019 (KR) .................. 10-2019-0005134

(51) Int. Cl.
*H04B 17/391* (2015.01)
*H04W 24/08* (2009.01)
*H04W 24/10* (2009.01)

(52) U.S. Cl.
CPC .......... *H04B 17/391* (2015.01); *H04W 24/08* (2013.01); *H04W 24/10* (2013.01)

(58) Field of Classification Search
None
See application file for complete search history.

(56) References Cited

U.S. PATENT DOCUMENTS

2010/0123575 A1  5/2010  Mittal et al.
2012/0320766 A1  12/2012 Sridhar
(Continued)

FOREIGN PATENT DOCUMENTS

JP  2018-170675 A  11/2018
KR  10-2003-0046904 A  6/2003
(Continued)

OTHER PUBLICATIONS

Korean Office Action dated Jun. 13, 2023, issued in Korean Patent Application No. 10-2019-0005134.
(Continued)

*Primary Examiner* — Alex Skripnikov
(74) *Attorney, Agent, or Firm* — Jefferson IP Law, LLP

(57) ABSTRACT

The present disclosure relates to a 5G or pre-5G communication system to be provided to support a higher data transfer rate beyond a 4G communication system such as LTE. The present invention relates to a method and device which detects performance degradation of a cell in relation to wireless communication and analyzes the degraded performance. More specifically, an analysis device for analyzing performance degradation of a cell in a wireless communication system according to an embodiment of the present invention comprises: a data retrieval unit for acquiring, from a cell, first data measured through wireless communication of the cell, a compression/decompression unit for acquiring second data by applying the first data to a particular model in which reference data related to an indicator for the performance of wireless communication is set, and a performance degradation determination unit for determining whether the performance of the cell is degraded, based on (Continued)

third data derived from the difference between the first data and the second data, wherein the compression/decompression unit acquires the second data by compressing and decompressing the first data according to the reference data.

14 Claims, 11 Drawing Sheets

(56) References Cited

U.S. PATENT DOCUMENTS

| | | | |
|---|---|---|---|
| 2013/0262656 | A1 | 10/2013 | Cao et al. |
| 2013/0290525 | A1 | 10/2013 | Fedor et al. |
| 2017/0331673 | A1 | 11/2017 | Iyer et al. |
| 2018/0024875 | A1* | 1/2018 | Della Corte ........ G06F 11/3452 714/37 |
| 2019/0068443 | A1* | 2/2019 | Li ........................ G06N 20/00 |

FOREIGN PATENT DOCUMENTS

| | | |
|---|---|---|
| KR | 10-2011-0084458 A | 7/2011 |
| KR | 10-2013-0062363 A | 6/2013 |
| KR | 10-2014-0023393 A | 2/2014 |
| KR | 10-2014-0147872 A | 12/2014 |
| KR | 10-2017-0077204 A | 7/2017 |
| WO | WO-2020088734 A1 * | 5/2020 |

OTHER PUBLICATIONS

Kingma et al.: Auto-Encoding Variational Bayes, 2014, https://arxiv.org/abs/1312.6114; May 1, 2014.

Goodfellow et al.: Generative Adversarial Nets, 2014, https://arxiv.org/abs/1406.2661; Jun. 10, 2014.

* cited by examiner

FIG. 8B

| NO. | Problem Class | Related Features |
|---|---|---|
| 1 | Zero Call | CRR_N, CRR_N_Ratio, IntraEnbAtt, InterX2InAtt, InterS1InAtt, RandomlySelectedPreamblesLow, Problem Class |
| 2 | HO Degradation | IntraEnbSucc, IntraEnbAtt, SumHoX2InSucc, SumHoX2InAtt, SumHoS1InSucc, SumHoS1InAtt, [0x0307]EccTmout_IntraHandoverCmdComplete, [0x0308]EccTmout_InterX2HandoverCmdComplete, [0x0309]EccTmout_InterS1HandoverCmdComplete |
| 3 | Signal Degradation | RssiOverPathAvg, InterferencePowerAvg, ThermalNoise |
| 4 | IP Throughput Degradation | IpThruMax, IpThru, DLResidualBlerRetrans0, DLResidualBlerRetransAvg, PdschBlerMcs0~28 |
| 5 | UL Degradation | ConnEstabRatio, ConnEstabAtt, ConnEstabSucc |

METHOD AND DEVICE FOR ANALYZING PERFORMANCE DEGRADATION OF CELL IN WIRELESS COMMUNICATION SYSTEM

TECHNICAL FIELD

The disclosure relates to a method and device for detecting performance degradation of a cell in relation to wireless communication and analyzing the degraded performance.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques have been discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In a network such as a wireless data network or a next-generation mobile communication network, performance related to wireless communication of a cell of a base station may be degraded in general due to a movement of a terminal or a load of the base station. For example, when terminals are concentrated in a certain base station, problems such as a decrease in radio channel quality and a reduction in a service radius of a corresponding cell may occur due to channel interference or the like. Detecting and analyzing such cell performance degradation (deterioration) may be an important task in operating a base station.

Conventionally, about twenty items of key performance indicator (KPI) related to wireless communication quality or cell performance were selected, for example, and a rule for each of the items was applied to determine whether the cell performance was degraded. However, when determining whether the cell performance is degraded in this way, only the problem for each item could be detected, and the detection accuracy was low in determining the overall performance degradation of the cell for wireless communication.

DISCLOSURE OF INVENTION

Technical Problem

Accordingly, an object of the disclosure is to provide a method and device for increasing the detection accuracy of cell performance degradation through artificial intelligence (AI) modeling.

Another object of the disclosure is to provide a method and device for determining the degraded performance feature of a corresponding cell by grouping the degraded performance features while performing AI modeling.

Solution to Problem

According to an embodiment of the disclosure, a device for analyzing performance degradation of a cell in a wireless communication system includes a data retrieval unit configured to acquire, from a cell, first data measured through wireless communication of the cell, a compression and decompression unit configured to acquire second data by applying the first data to a specific model in which reference data related to a performance indicator of the wireless communication is set, and a performance degradation determination unit configured to determine whether a performance of the cell is degraded based on third data derived from a difference between the first data and the second data. The compression and decompression unit is further configured to acquire the second data by compressing and decompressing the first data based on the reference data.

In addition, according to an embodiment of the disclosure, an analysis method of a device for analyzing performance degradation of a cell in a wireless communication system includes acquiring, from a cell, first data measured through wireless communication of the cell, acquiring second data by applying the first data to a specific model in which reference data related to a performance indicator of wireless communication is set, and determining whether a performance of the cell is degraded based on third data derived from a difference between the first data and the second data. The second data may be acquired by compressing and decompressing the first data based on the reference data.

Advantageous Effects of Invention

According to an embodiment of the disclosure, because a plurality of KPI items can be integrally determined, there is an effect of increasing the accuracy of detecting whether a cell performance is degraded.

In addition, according to an embodiment of the disclosure, when the cell performance is degraded, it is possible to determine a feature of the degraded cell performance among various features and receive information about the determined feature.

BRIEF DESCRIPTION OF DRAWINGS

FIG. 8B is a diagram illustrating an example of data related to each performance feature.

MODE FOR THE INVENTION

Figure 1:
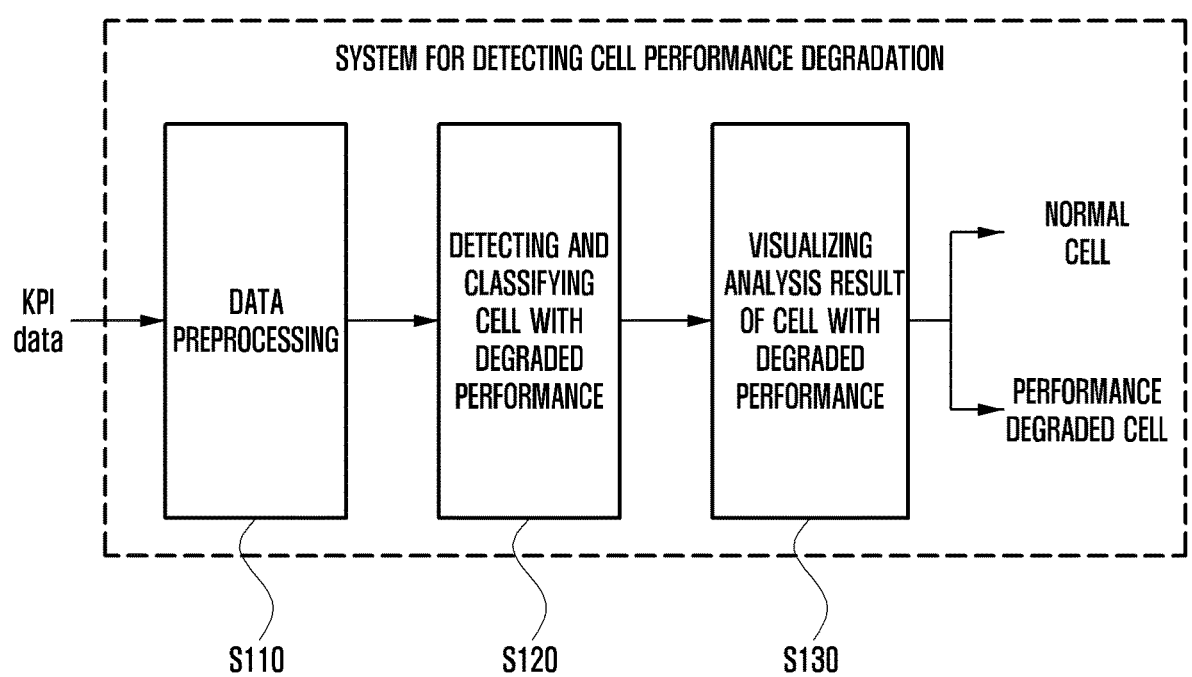
FIG. 1 is a conceptual diagram simply illustrating an operation of a system for detecting cell performance degradation according to an embodiment of the disclosure.

In describing the disclosure, when it is determined that detailed descriptions of related known functions or elements may unnecessarily obscure the subject matter of the disclosure, detailed descriptions thereof will be omitted. In addition, terms to be described later are terms defined in consideration of functions in the disclosure, which may vary according to a user's or operator's intention or practice. Therefore, the definition should be made based on the contents throughout this specification.

Also, in describing embodiments of the disclosure, the subject matter of the disclosure can be applied to other communication systems having a similar technical background or channel form through some modifications within the scope of the disclosure. This will be apparent to a person skilled in the art.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s).

These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s).

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors.

Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, the unit may include one or more processors.

Hereinafter, a method according to an embodiment of the disclosure for detecting and determining whether cell performance is degraded will be described in detail with reference to the accompanying drawings.

Figure 2:
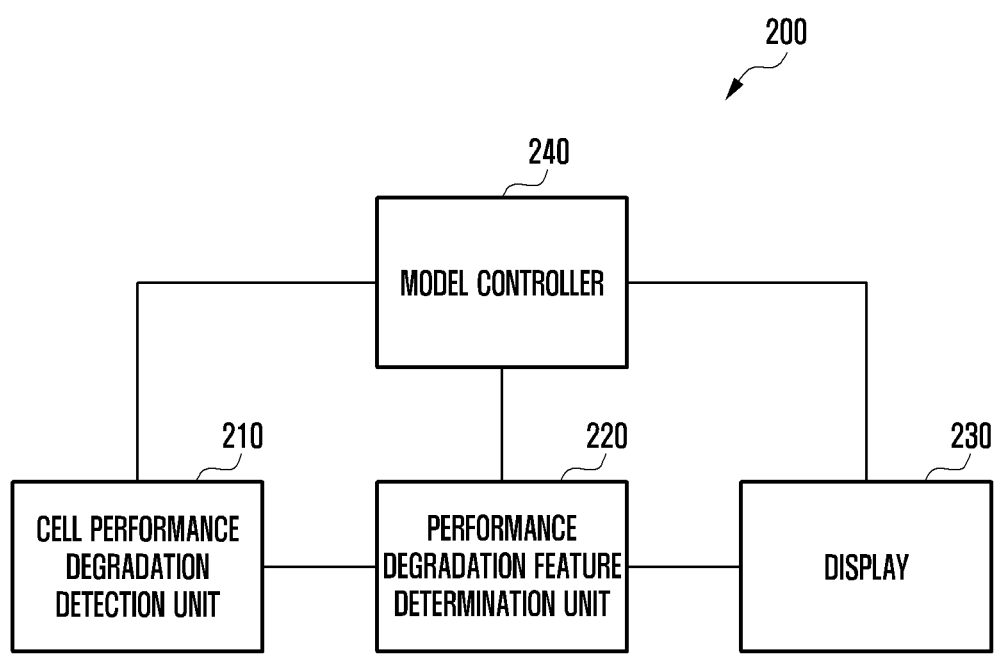
FIG. 2 is a block diagram simply illustrating elements of an analysis device according to an embodiment of the disclosure.

FIG. 1 is a conceptual diagram simply illustrating an operation of a system for detecting cell performance degradation according to an embodiment of the disclosure. FIG. 2 is a block diagram simply illustrating elements of an analysis device according to an embodiment of the disclosure.

Referring to FIG. 1, the cell performance degradation analysis system according to an embodiment of the disclosure selects a plurality of KPI items (e.g., about 180) for wireless communication, and receives data about the corresponding items as input.

The cell performance degradation analysis system according to an embodiment of the disclosure may form an AI model through an operation (S110) of preprocessing the input data about the KPI items. The input data about the KPI items may be, for example, data acquired from wireless communication of a cell in which deterioration has not occurred for each KPI item. That is, the input data about the KPI items may be values determined to be data related to wireless communication of a normal cell because data about each KPI item is included in a range of predetermined threshold values.

When the data about the plurality of KPI items are inputted as described above, the cell performance degradation analysis system according to an embodiment of the disclosure may form reference data to be applied to the AI model through an operation of learning the input data. For example, the learning operation may refer to an operation of strengthening a value related to the feature of each input data. The operation of learning the plurality of KPI items will be described later with reference to FIG. 3.

When the learning about the KPI items is completed in the data preprocessing operation, data related to wireless communication of a cell may be received as an input from the cell for which performance degradation or not will be determined. In addition, it is possible to determine by applying the data received from the cell to the predetermined AI model whether the performance of the cell is degraded, and if the performance is degraded, it is possible to determine which of a plurality of features related to the performance degradation has a problem. That is, by analyzing data related to wireless communication of a cell, it is possible to detect the cell with degraded performance and classify features with degraded performance (S120).

Thereafter, in order to provide the analysis result of the cell with degraded performance to a user, it is possible to visualize and provide the analysis result as a graph or the like (S130). Based on the visualized result, the user can determine whether the cell of interest is a normally operating cell or performance degraded cell.

The above-described operations of preprocessing the data about the plurality of KPI items and detecting the cell performance degradation in FIG. 1 may be performed by a cell performance degradation detection unit 210 of an analysis device 200 shown in FIG. 2.

Specifically, when receiving data about a plurality of KPI items as an input, the cell performance degradation detection unit 210 according to an embodiment of the disclosure may learn the data to be set as reference data of the AI model. In addition, different performance degradation features may be classified (feature grouping) by using data about each of the plurality of KPI items in order to determine the performance degradation feature of the cell. This will be described in detail in FIG. 8A.

In addition, when data related to wireless communication of the cell is inputted, the cell performance degradation detection unit 210 according to an embodiment of the disclosure may apply the data of the cell to the predetermined AI model and thereby detect whether the performance of the cell is degraded. For example, by processing the data of the cell using the reference data applied to the AI model and then comparing the processed result data with the data of the cell, it is possible to determine whether the cell performance is degraded.

In addition, when determining that the performance of the cell is degraded, the cell performance degradation detection unit 210 according to an embodiment of the disclosure may transmit the processed data of the cell to a performance degradation feature determination unit 220. The performance degradation feature determination unit 220 according to an embodiment of the disclosure may determine a performance degraded feature of the cell by comparing the data received from the performance degradation detection unit 210 with the features grouped by the performance degradation detection unit 210 through the data preprocessing operation. For example, by using a plurality of detectors that detect the respective grouped features, it is possible to determine the performance degraded feature of the cell. This will be described in detail with reference to FIG. 7.

When the performance of the cell has been degraded and the performance degraded feature is determined as described above, the performance degradation feature determination unit 220 according to an embodiment of the disclosure may transmit analysis result information to a display 230 according to an embodiment of the disclosure. The display 230 according to an embodiment of the disclosure may schematize the information on the analysis result into a drawing or graph and then visually provide it to a user.

In addition, the analysis device 200 according to an embodiment of the disclosure may include a model controller 240 that controls the operations of the above elements and performs an operation of setting or changing the AI model by using data acquired from each element. The model controller 240 according to an embodiment of the disclosure may control, for example, the cell performance degradation detection unit 210 to generate the reference data by learning the data acquired from normal cells, and may set the AI model for determining the performance degradation or not of cells by receiving control result values. In addition, the model controller may control the respective elements to apply the input data of the cells to the set AI model, control the cell performance degradation detection unit 210 to perform the feature grouping operation, and control the performance degradation feature determination unit 220 to determine the performance degraded feature of the cell.

Hereinafter, each operation performed by each element of the analysis device according to an embodiment of the disclosure described in FIG. 2 will be described in detail with reference to related drawings.

Figure 3:
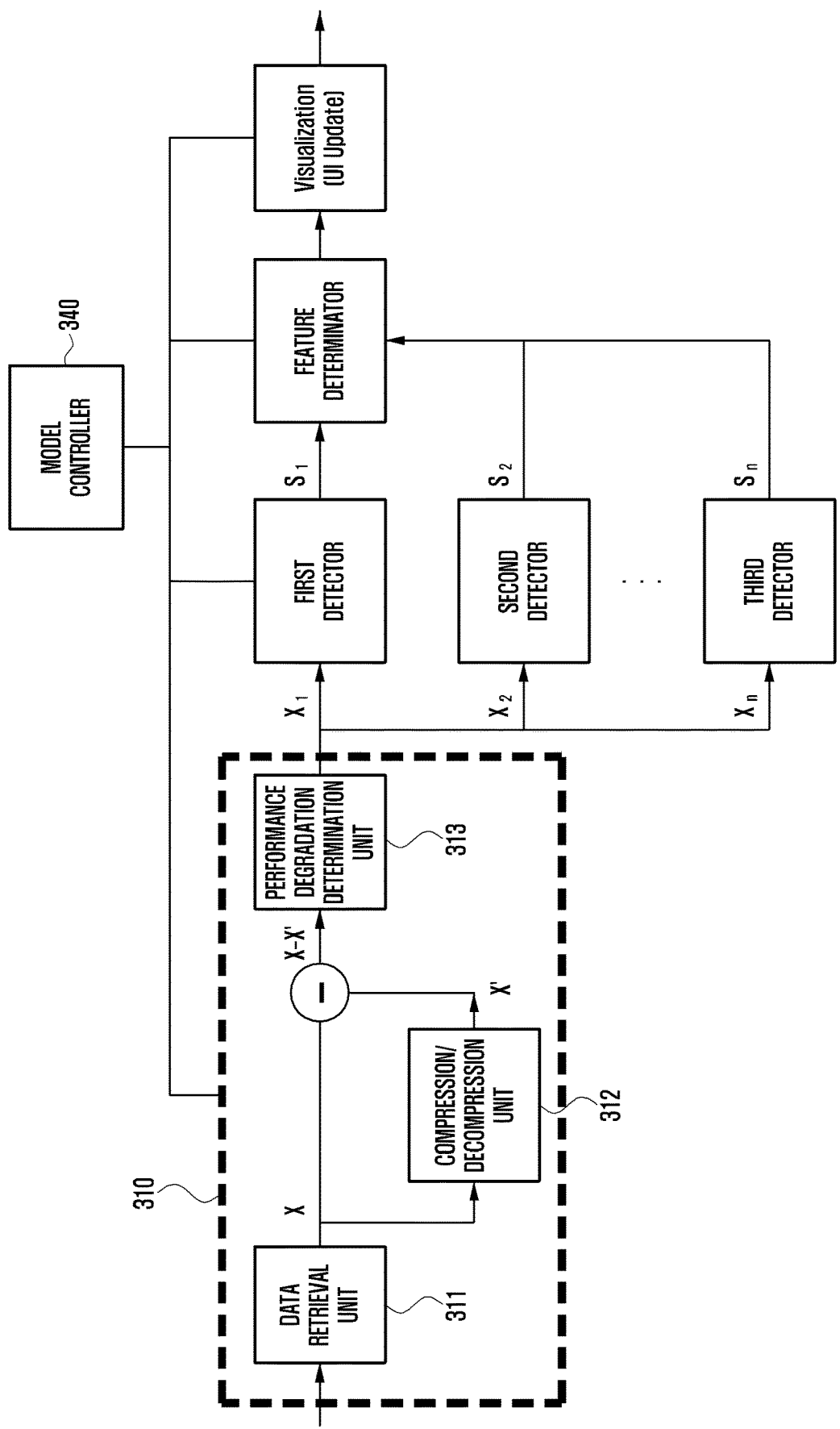
FIG. 3 is a block diagram illustrating in detail a structure of a device for analyzing cell performance degradation according to an embodiment of the disclosure.
Figure 4:
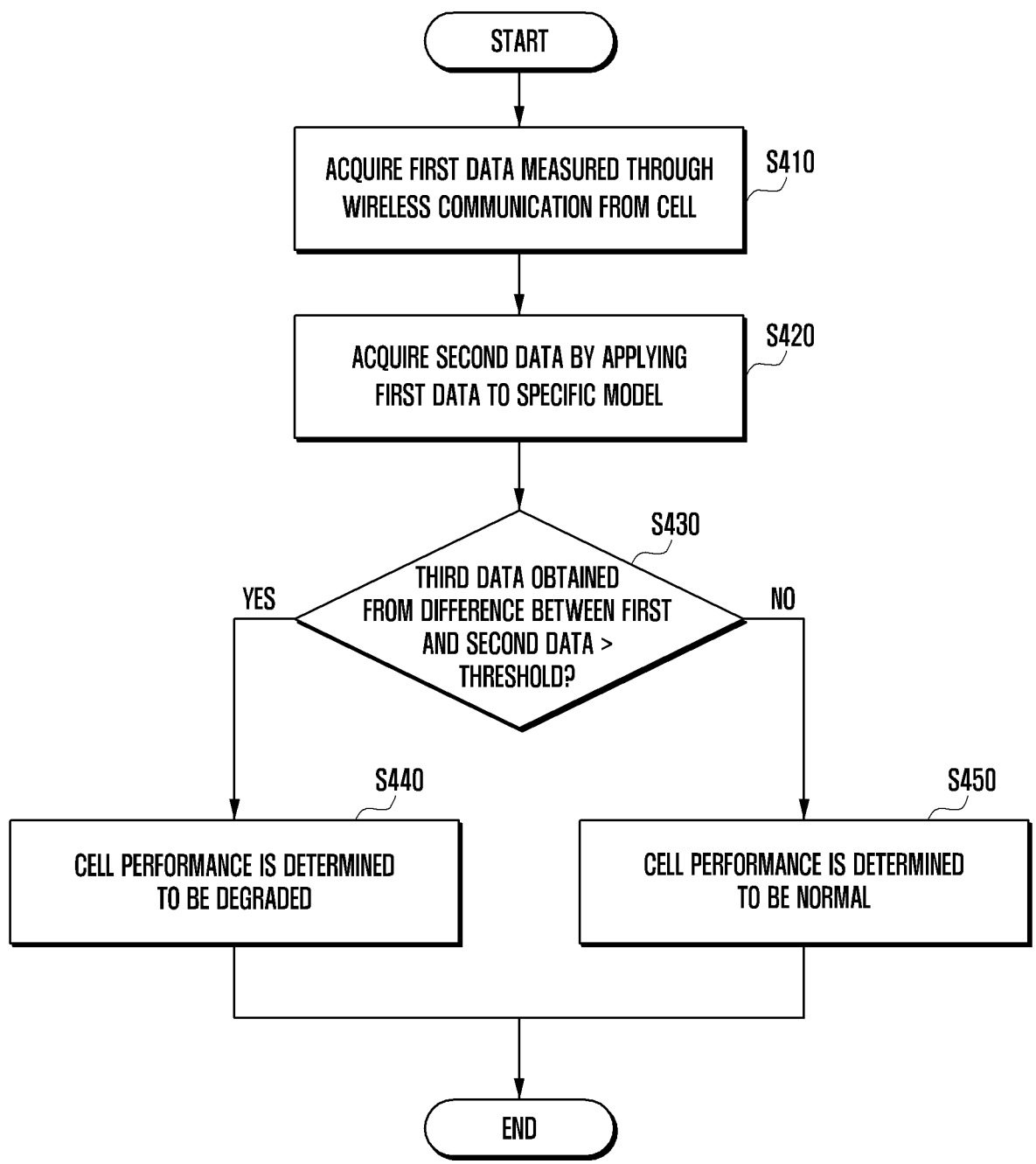
FIG. 4 is a flow diagram illustrating a method for detecting cell performance degradation according to an embodiment of the disclosure.
Figure 5:
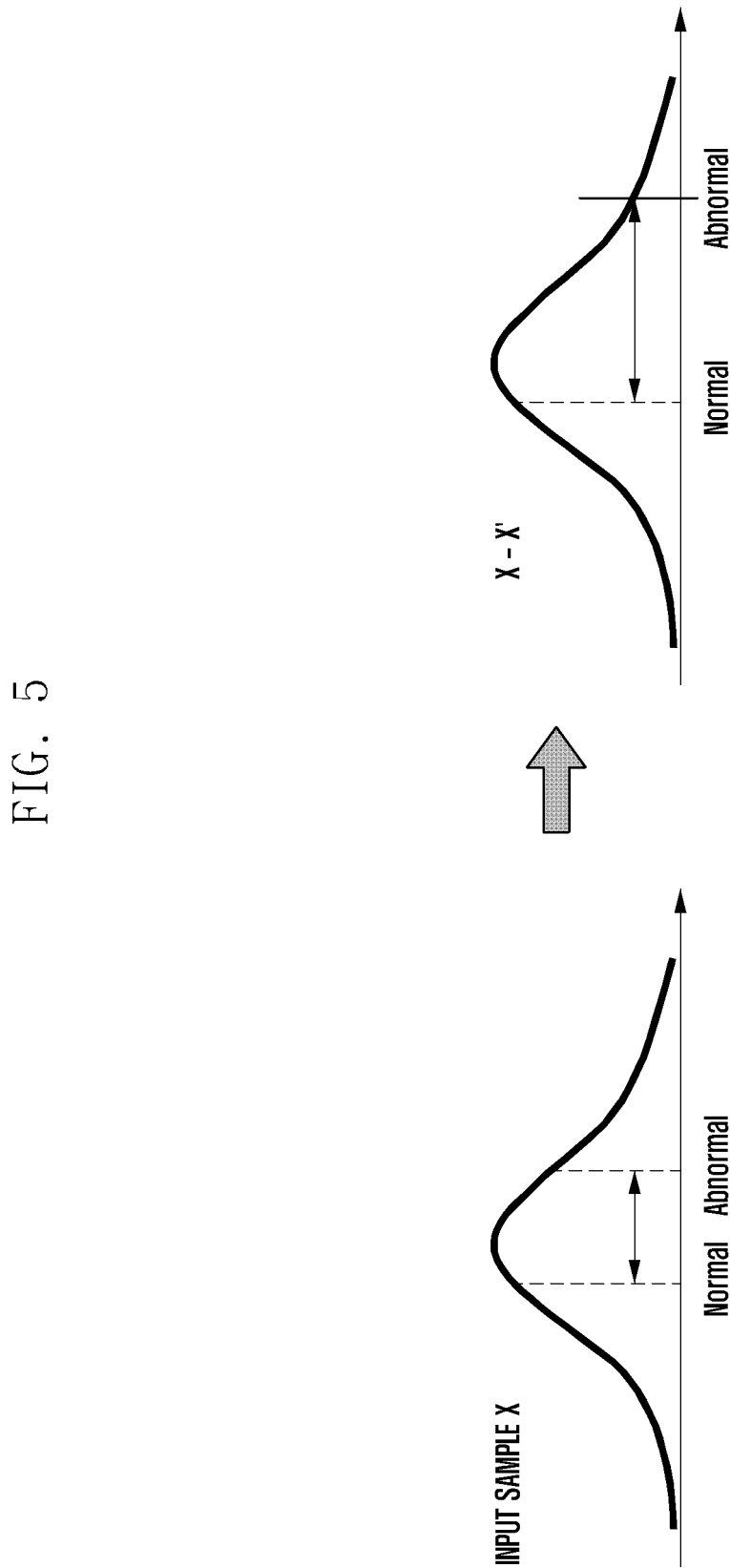
FIG. 5 is a graph illustrating an effect of a data processing operation according to an embodiment of the disclosure.

FIG. 3 is a block diagram illustrating in detail a structure of a device for analyzing cell performance degradation according to an embodiment of the disclosure. FIG. 4 is a flow diagram illustrating a method for detecting cell performance degradation according to an embodiment of the disclosure. FIG. 5 is a graph illustrating an effect of a data processing operation according to an embodiment of the disclosure.

As described above in FIG. 2, the analysis device according to an embodiment of the disclosure may include the cell performance degradation detection unit, the performance degradation feature determination unit, the display, and the model controller. As shown in FIG. 3, the cell performance degradation detection unit according to an embodiment of the disclosure may include a data retrieval unit, a compression and decompression unit, and a performance degradation determination unit. In addition, the performance degradation feature determination unit according to an embodiment of the disclosure may include a plurality of detectors and a feature determinator. However, the operation of the performance degradation feature determination unit according to an embodiment of the disclosure will be described later with reference to FIG. 6.

First, referring to FIG. 3, the analysis device according to an embodiment of the disclosure may include a cell performance degradation detection unit 310 that performs AI modeling by learning data about a plurality of KPI items and performs an operation of determining whether performance of a specific cell has been degraded.

The cell performance degradation detection unit 310 may include a data retrieval unit 311 that receives external data as an input, a compression and decompression unit 312 that processes data through a compression and decompression operation on the data inputted from the data retrieval unit 311, and a performance degradation determination unit 313 that receives data from each of the data retrieval unit 311 and the compression and decompression unit 312 and then determines whether the performance of the corresponding cell has been degraded.

First, the data retrieval unit 311 according to an embodiment of the disclosure may receive various data related to wireless communication of cells as inputs. For example, for each of a plurality of KPI items (performance indicators), the data retrieval unit 311 according to an embodiment of the disclosure may acquire data including reference values for determining a normal cell. In this case, the data retrieval unit 311 according to an embodiment of the disclosure may generate reference data by integrating reference values respectively corresponding to the plurality of performance indicators under the control of the model controller 340. In another example, the data retrieval unit 311 according to an embodiment of the disclosure may receive data related to wireless communication of a cell (hereinafter, referred to as a detection target cell) which is a target of performance degradation detection. Specifically, the data retrieval unit 311 according to an embodiment of the disclosure may receive statistical data of all users performing wireless communication in units of 15 minutes or 1 hour from the detection target cell.

The compression and decompression unit 312 according to an embodiment of the disclosure processes data received from the data retrieval unit 311 through an operation of compressing and decompressing the data so that a difference between values greater than a threshold value, which is a criterion for determining the performance of each data, and values smaller than the threshold value becomes larger. That is, the compression and decompression unit 312 according to an embodiment of the disclosure performs in each data an operation of processing a value, which is largely derived by a feature related to the cell performance (e.g., a feature corresponding to a specific KPI item), to be more remarkable.

In one example, the compression and decompression unit 312 according to an embodiment of the disclosure may receive the reference data acquired by integrating the reference values for the plurality of KPI items and perform a compression and decompression operation under the control of the model controller 340. In this case, through the compression and decompression process, a value which is a reference of the reference data may be further strengthened. The reference data passing through the compression and decompression process is set in the AI model as a criterion for determining whether the cell performance is degraded by the model controller 340.

In addition, when data is received from a detection target cell, the compression and decompression unit 312 according to an embodiment of the disclosure may perform the compression and decompression process on the received data. In this case, because the data of the detection target cell is applied to the AI model set by the reference data, values falling within the range of the reference data remain, and values failing to fall within the range of the reference data are removed through the compression and decompression process.

Meanwhile, such a compression and decompression operation may use a general clustering method, but a K-means clustering method may be used in the disclosure.

When the above-described process of compressing and decompressing the data of the detection target cell is completed, the processed data may be delivered to the performance degradation determination unit 313 according to an embodiment of the disclosure. The performance degradation determination unit 313 according to an embodiment of the disclosure acquires data related to wireless communication of the detection target cell inputted from the data retrieval unit 311, acquires data processed by the compression and decompression unit 312, and may determine through a difference between both data whether there is performance degradation.

Specifically, the performance degradation determination unit 313 according to an embodiment of the disclosure may determine a difference between data X received from the data retrieval unit 311 and data X' received from the compression and decompression unit 312, and compare a difference value with a predetermined threshold. For example, if the difference value is greater than the predetermined threshold, the performance degradation determination unit 313 according to an embodiment of the disclosure determines that the performance of the detection target cell is degraded. In contrast, if the difference value is smaller than the predetermined threshold, the performance degradation determination unit 313 according to an embodiment of the disclosure determines that the performance of the detection target cell is normal.

The operations of the above-described elements will be described again with reference to FIG. 4.

Referring to FIG. 4, the analysis device according to an embodiment of the disclosure may acquire first data measured through wireless communication from a cell (S410).

Here, the cell refers to a target cell for determining whether the performance is degraded. The first data measured through wireless communication is the whole data that the cell can acquire through wireless communication with a plurality of terminals for a predetermined time. For example, total statistical data that can be determined by integrating a plurality of KPI items may correspond to the first data.

When the first data is acquired, the analysis device according to an embodiment of the disclosure may acquire second data by applying the first data to a specific model (S420).

Here, the specific model may refer to an AI model to which a result of learning reference data formed by integrating reference values for the respective KPI items is applied. That is, as described above in FIG. 3, after the reference data is learned through the compression and decompression process, the result may be applied to the AI model as a reference. Then, based on the reference data set in the AI model, the second data may be acquired by performing a process of compressing and decompressing the first data.

When the second data is acquired, the analysis device according to an embodiment of the disclosure may compare third data obtained from a difference between the first data and the second data with a predetermined threshold (S430).

Here, the predetermined threshold refers to a value that serves as a criterion for determining whether the cell performance is degraded, and may be set using the reference data acquired from the reference values of the respective KPI items.

If the third data is greater than the predetermined threshold, the analysis device according to an embodiment of the disclosure may determine that the performance of the detection target cell is degraded (S440). In contrast, if the third data is smaller than the predetermined threshold, the analysis device may determine that the performance of the target cell is normal (S450).

The analysis device according to an embodiment of the disclosure can first learn reference values for determining a normal cell for each item through the above method, then receive data of a detection target cell, and determine the performance degradation or not of the cell based on the reference values.

In particular, the analysis device according to an embodiment of the disclosure does not simply set the reference data and then compare the input data with the reference data, but performs the compression and decompression operation to make the value derived from each feature more remarkable. Through this, the accuracy of detection can be further improved.

That is, referring to FIG. 5, in case of simply comparing a reference value (normal) set through reference data with a feature value (abnormal) of a detection target cell, a difference as shown in the left figure is used to determine whether or not the performance of the cell is degraded. However, as in an embodiment of the disclosure, in case of performing the compression and decompression process for the reference value and also performing the compression and decompression process for the feature value of the detection target cell, a difference between the reference value and the feature value is derived to be more remarkable as shown in the right figure. Accordingly, there is an effect that the detection accuracy of whether the cell performance is degraded can be further improved.

Meanwhile, when determining that the performance of the cell is degraded, the analysis device according to an embodiment of the disclosure may further determine which feature the degraded performance is related to. That is, according to an embodiment of the disclosure, even when analyzing the integrated data for the plurality of KPI items related to wireless communication, it is possible to determine which performance feature is degraded in a corresponding cell.

Figure 6:
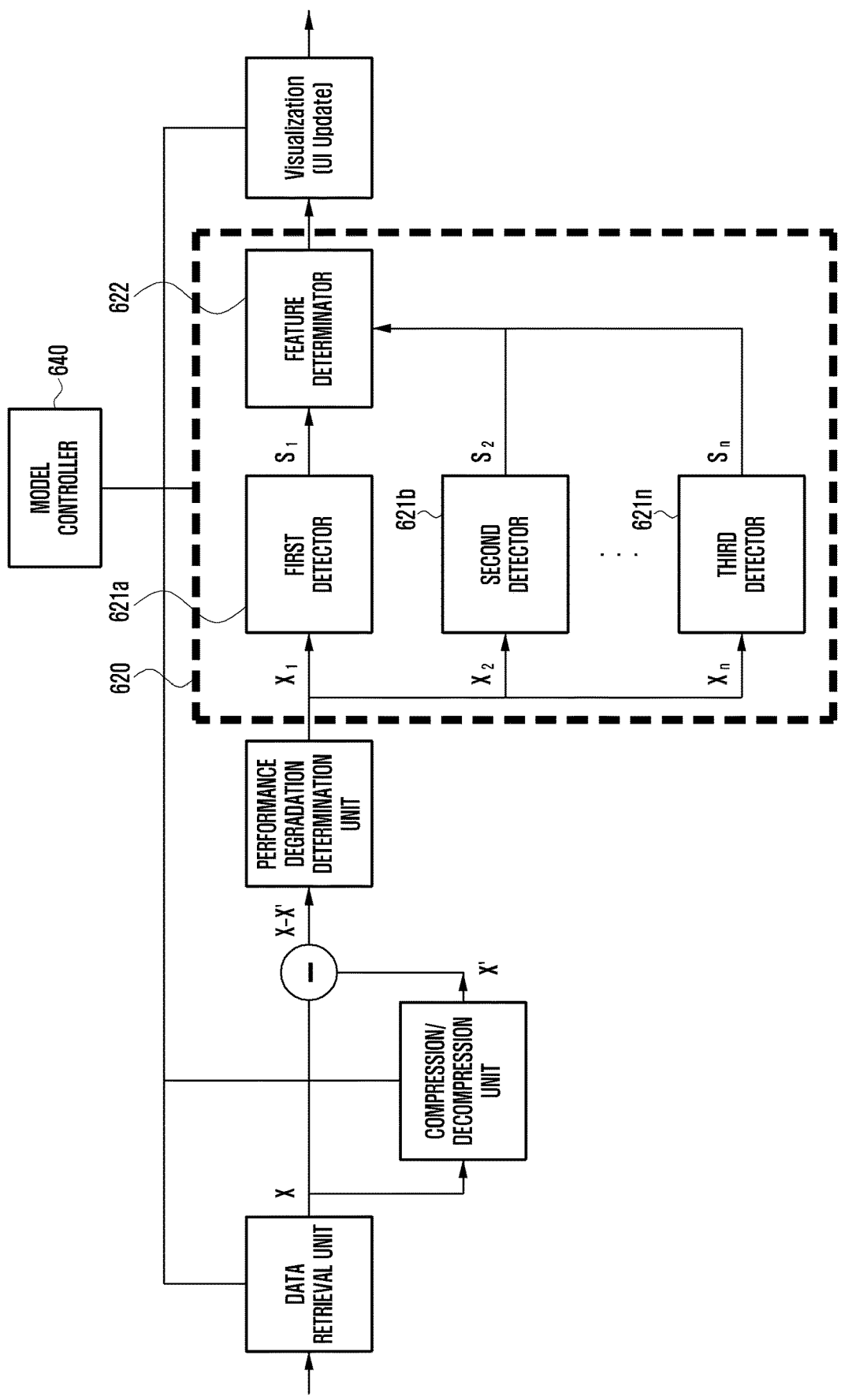
FIG. 6 is a block diagram illustrating in detail a structure of a device for analyzing cell performance degradation according to an embodiment of the disclosure.
Figure 7:
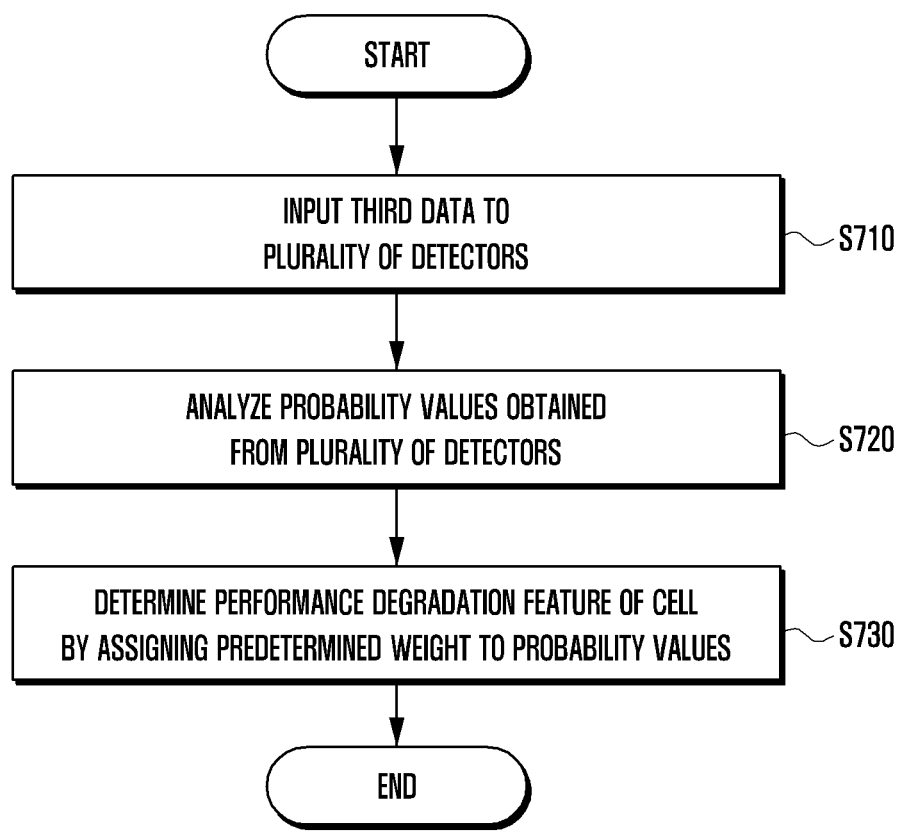
FIG. 7 is a flow diagram illustrating a method for determining a feature of degraded performance of a cell according to an embodiment of the disclosure.
Figure 8A:
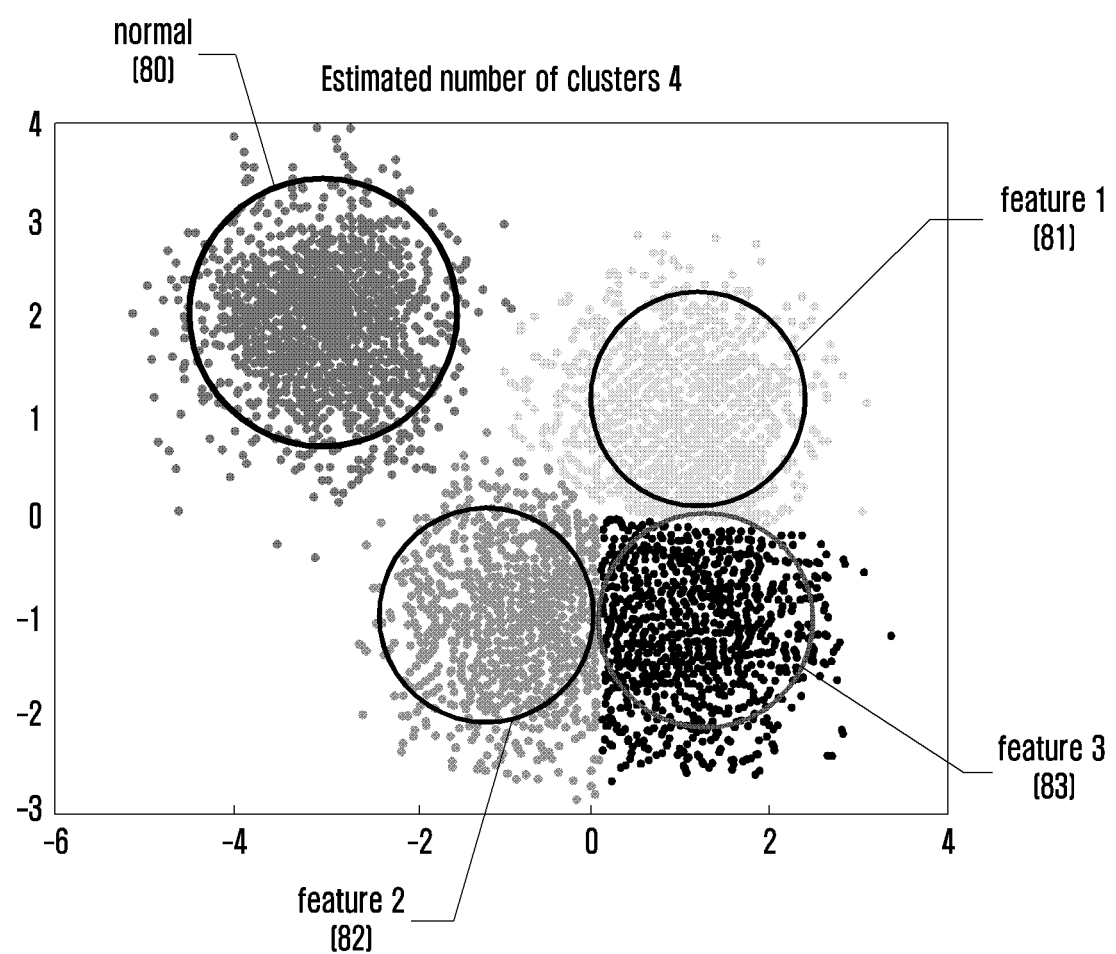
FIG. 8A is a diagram illustrating an example of grouping features of performance according to an embodiment of the disclosure.

FIG. 6 is a block diagram illustrating in detail a structure of a device for analyzing cell performance degradation according to an embodiment of the disclosure. FIG. 7 is a flow diagram illustrating a method for determining a feature of degraded performance of a cell according to an embodiment of the disclosure. FIG. 8A is a diagram illustrating an example of grouping features of performance according to an embodiment of the disclosure. FIG. 8B is a diagram illustrating an example of data related to each performance feature.

First, referring to FIG. 6, the performance degradation feature determination unit 620 according to an embodiment of the disclosure may include the plurality of detectors $621a$, $621b$, ..., $621n$ and the feature determinator 622.

As described above in FIG. 3, the model controller 640 according to an embodiment of the disclosure may group features for the respective KPI items and then respectively set the grouped features to the plurality of detectors $621a$, $621b$, ..., $621n$. Specifically, the model controller 640 according to an embodiment of the disclosure may control the compression and decompression unit 612 to compress and decompress the reference values for the plurality of KPI items. In addition, result values for the respective reference values acquired from the compression and decompression unit 612 may be grouped and mapped to respective features related to cell performance (feature grouping).

When the feature grouping operation is performed as described above, the model controller 640 according to an embodiment of the disclosure may configure the plurality of detectors $621a$, $621b$, ..., $621n$ for detecting each feature group corresponding to data acquired from the cell.

The plurality of detectors $621a$, $621b$, ..., $621n$ according to an embodiment of the disclosure are set to correspond to the respective feature groups related to the performance of the cell, and each may receive data of the detection target cell from the performance degradation determination unit 613 according to an embodiment of the disclosure. Here, the data of the detection target cell received from the performance degradation determination unit 613 may be data caused by a difference between original data related to wireless communication of the cell and data obtained through the process of compressing and decompressing the original data as described above in FIG. 4.

The plurality of detectors $621a$, $621b$, ..., $621n$ according to an embodiment of the disclosure may check whether input data is relevant to a corresponding feature group. For example, the plurality of detectors $621a$, $621b$, ..., $621n$ according to an embodiment of the disclosure may output a probability value of how much the range of data inputted to each detector is relevant to each feature group. For example, in the disclosure, each detector may use a neural network-based variational autoencoder (VAE), GAN, or the like.

When a plurality of detection values are outputted from the plurality of detectors $621a$, $621b$, ..., $621n$ according to an embodiment of the disclosure, the feature determinator 622 according to an embodiment of the disclosure may compare the detection values and thereby determine which performance feature is degraded in the corresponding cell. For example, when a plurality of probability values indicating a degree of relevance to each feature are outputted from each detector, the characteristic determinator 622 according to an embodiment of the disclosure may assign a predetermined weight to the plurality of probability values and thereby determine which performance feature of the cell is degraded.

Hereinafter, the above-described process will be described again with reference to FIG. 7.

When it is determined that the performance of the cell is degraded, the analysis device according to an embodiment of the disclosure may input third data which is a difference between first data related to wireless communication of the cell and second data obtained by applying the first data to a specific model and performing a compression and decompression operation (S710). Each of the plurality of detectors may output probability values obtained by comparing the inputted third data with reference values for features set in each of the detectors.

When the probability values are outputted from the plurality of detectors, the magnitudes of the outputted probability values may be compared (S720).

Then, by assigning a predetermined weight to the probability values, it is possible to determine the performance degradation feature of the cell (S730). For example, it is possible to check statistics on a history of past problem occurrences, assign a weight to a probability value for a feature with a high frequency of occurrence or a high severity of a problem phenomenon, and determine the performance degradation feature of the cell based on a result of the detector in which the product of the weight and the probability value is calculated the highest.

The above-described group of features related to the performance of the cell is illustrated in FIGS. 8A and 8B.

Referring to FIG. 8A, data related to a plurality of KPI items may be grouped in a clustering form and classified according to features by the model controller according to an embodiment of the disclosure. For example, features may be classified into a normal group 60 of reference values, a first feature group 61 related to a handover error, a second feature group 62 related to a call connection failure, and a third feature group 63 related to throughput degradation.

FIG. 8B illustrates respective features and data values grouped into such features. For example, in FIG. 8B, features (problem classes) related to cell performance degradation may include zero call, HO degradation, signal degradation, IP throughput degradation, and UL degradation.

In addition, data for determining each feature may be values mapped to the right column of the table in FIG. 8B. For example, in case of zero call, it may be determined based on data such as an accumulated value for a cause event that a call is normally released, a ratio of a cause event that a call is normally released, an accumulated value as statistical data on the number of handovers between cells in a base station in case of being determined as intra HO in handover decision after receiving a measurement report message from a terminal, an accumulated value as statistical data on the number of X2 handovers between base stations in case of receiving a handover request message from a source eNB based on a target eNB, an accumulated value in case where a target eNB receives an S1 handover request message, and an accumulated value of the number of group A preambles among RACH preambles collected periodically.

In another example, in case of HO degradation, it may be determined based on data such as an accumulated value as statistical data on the number of handovers between cells in a base station in case where a target cell normally receives an RRC connection reconfiguration complete message from a terminal by performing intra HO, an accumulated value as statistical data on the number of handovers between cells in a base station in case of being determined as intra HO in handover decision after receiving a measurement report message from UE, the sum of X2 handover execution success counts in TeNB as an E-UTRAN mobility function indicator, the sum of X2 handover attempt counts in TeNB as an E-UTRAN mobility function indicator, the sum of S1 handover execution success count in TeNB as an E-UTRAN mobility function indicator, the sum of S1 handover attempt counts in TeNB as an E-UTRAN mobility function indicator, and call summary log statistics.

In still another example, in case of signal degradation, it may be determined based on data such as an average value of received signal strength indication (RSSI) for each cell as a power-related statistic, and an average value of interference power per physical resource block (PRB) during a collection period as a power-related statistic.

In yet another example, in case of IP throughput degradation, it may be determined based on data such as the maximum value of IpThru statistics item which is Air RLC packet statistics, an IP throughput collected using a method described in 3GPP TS 32.450 for cell and QCI which is Air RLC packet statistics, a calculation value of physical downlink shared channel (PDSCH) BLER for initial transmission during a collection period (the number of first retransmission compared to the number of initial transmission as a failure rate for initial transmission), an average value of DLResidualBlerRetrans0 to DLResidualBlerRetrans3 during a collection period, and a BLER for PDSCH transmitted with MCS0 during a collection period (the number of transmission failures compared to the total number of transmissions as a transmission-to-failure rate).

In further another example, in case of UL degradation, it may be determined based on data such as a rate value of successful RRCConnectionRequest (connection) from a terminal, an accumulated value in case of receiving RRCConnectionRequest from a terminal, and an accumulated value in case of receiving RRCConnectionSetupComplete from UE in an RRC connection establishment procedure.

Figure 9:
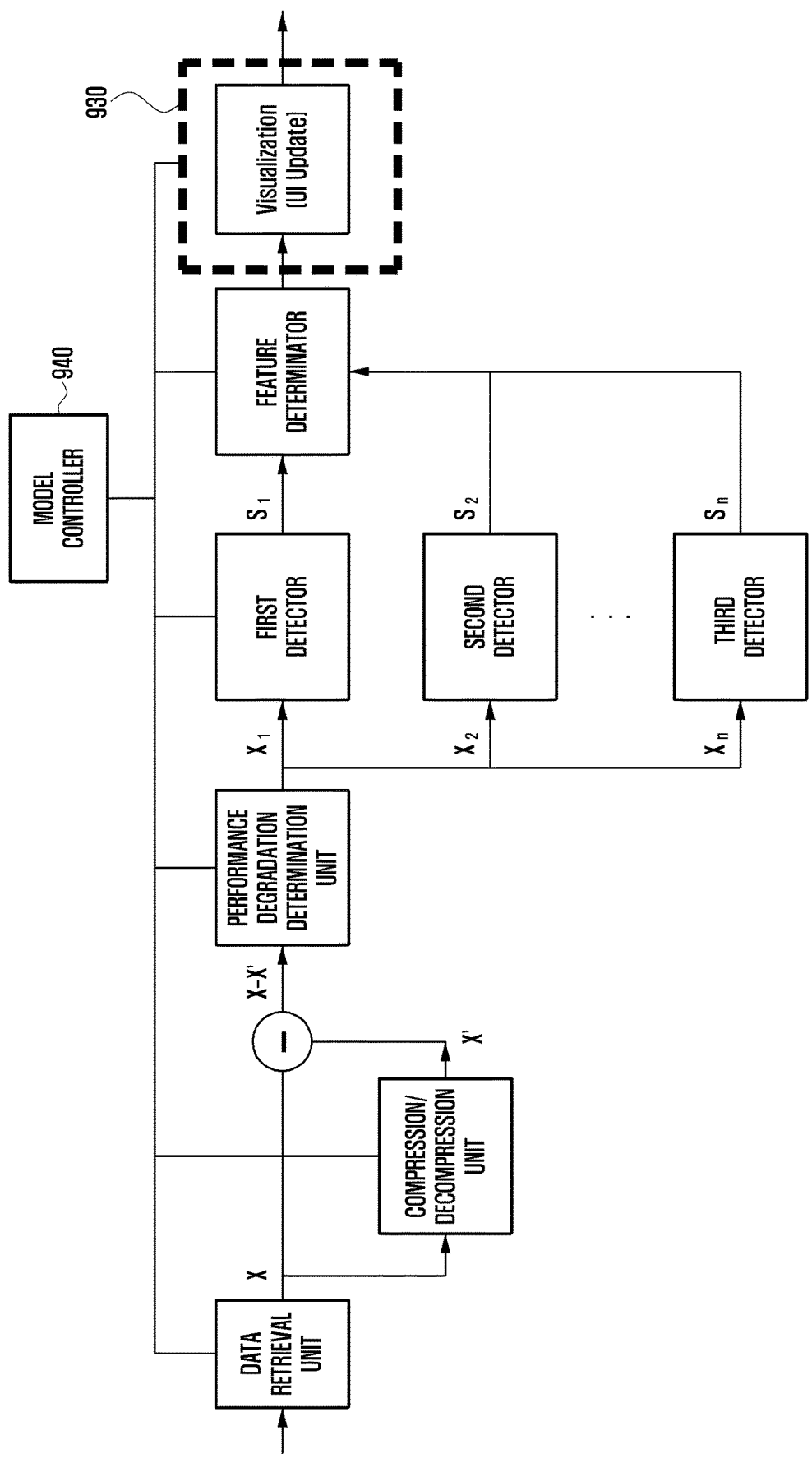
FIG. 9 is a block diagram illustrating in detail a structure of a device for analyzing cell performance degradation according to an embodiment of the disclosure.
Figure 10:
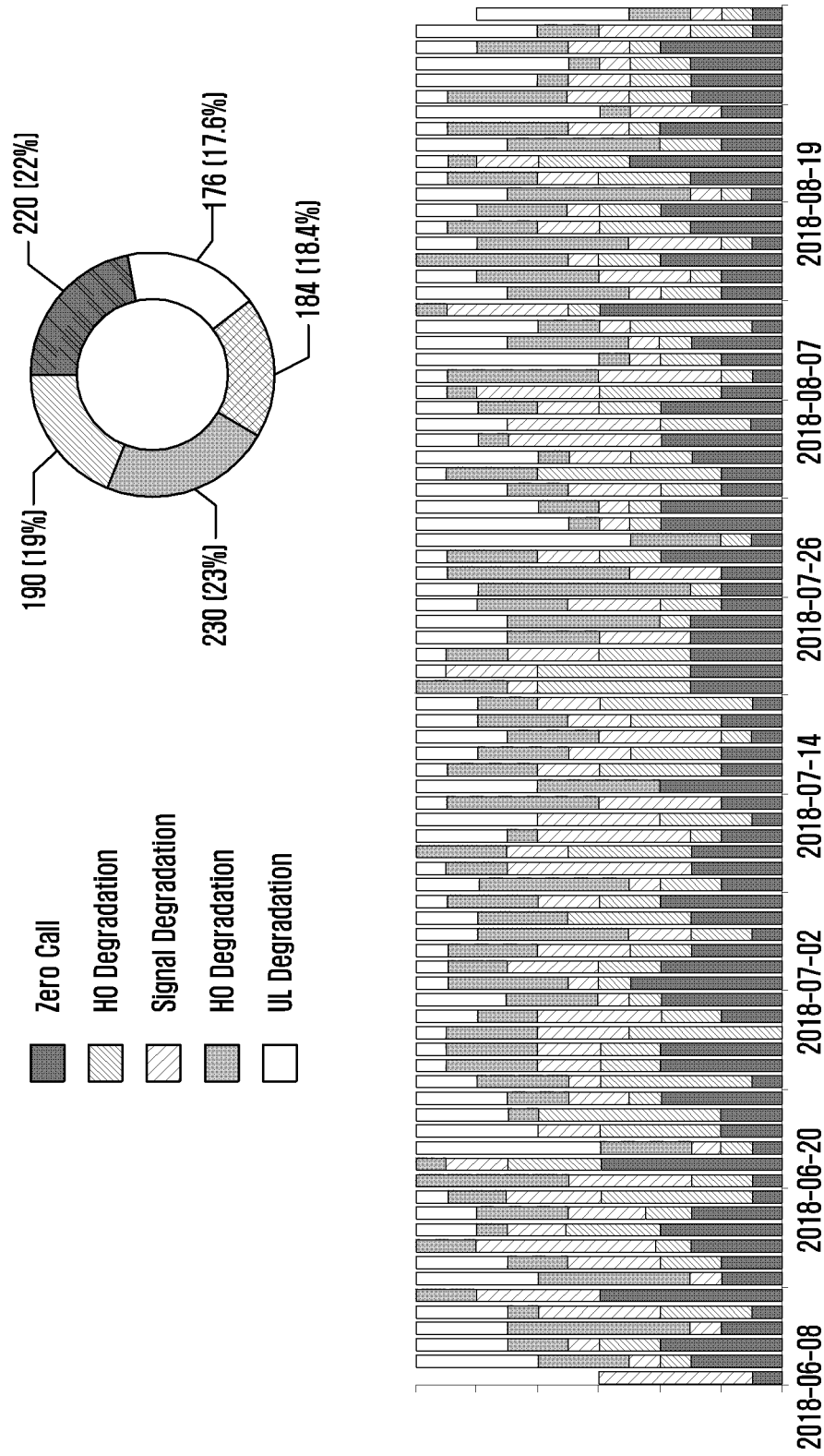
FIG. 10 is a schematic diagram illustrating information on cell performance degradation according to an embodiment of the disclosure.

FIG. 9 is a block diagram illustrating in detail a structure of a device for analyzing cell performance degradation according to an embodiment of the disclosure. FIG. 10 is a schematic diagram illustrating information on cell performance degradation according to an embodiment of the disclosure.

Referring to FIG. 9, when the degraded performance and performance degraded feature of the cell are identified by the performance degradation feature determination unit, the model controller 940 according to an embodiment of the disclosure may control the display 930 to provide them to the user.

For example, the display 930 according to an embodiment of the disclosure may acquire data on a result of performance degradation of a detection target cell from the degradation feature determination unit. The acquired data may be data indicating how much data related to wireless communication of a detection target cell is relevant to each of a plurality of features.

The display 930 according to an embodiment of the disclosure that has acquired such data may schematize the acquired data so that the user can easily understand information on the acquired data. For example, as shown in FIG. 10, the result related to the performance degradation of the cell may be provided to the user in the form of a circular graph indicating a performance degraded feature of a cell and a probability value for each feature or in the form of a bar graph indicating how each feature varies with time.

Persons skilled in the art to which the disclosure pertains will be able to understand that the disclosure can be implemented in other specific forms without changing the technical subject matter or essential features thereof. Therefore, it should be understood that the above-described embodiments are illustrative and non-limiting in all respects. The scope of the disclosure is indicated by the scope of claims recited below rather than the detailed description, and it should be interpreted that all modified forms derived from the claims and equivalents thereof are included in the scope of the disclosure.

Embodiments of the disclosure and the accompanying drawings are only examples in order to easily describe the disclosure and facilitate comprehension of the disclosure, but are not intended to limit the scope of the disclosure. Therefore, in addition to the embodiments disclosed herein, the scope of the disclosure should be construed to include all modifications or modified forms drawn based on the disclosure and is defined by the appended claims and their equivalents.

The invention claimed is:

1. A device for analyzing performance degradation of a cell in a wireless communication system, the device comprising:
    a data retrieval unit configured to acquire, from a cell, first data measured through wireless communication of the cell;
    a compression and decompression unit configured to acquire second data by applying the first data to a specific model in which reference data related to a performance indicator of the wireless communication system is set; and
    a performance degradation determination unit configured to determine whether a performance of the cell is degraded based on third data derived from a difference between the first data and the second data,
    wherein the second data is acquired by the compression and decompression unit by compressing and decompressing the first data based on the reference data.

2. The device of claim 1, wherein the performance degradation determination unit is further configured to:
    compare the third data with a predetermined threshold; and
    determine the performance of the cell being degraded, in case that the third data is greater than the predetermined threshold.

3. The device of claim 1, further comprising:
    a model controller configured to:
        control the data retrieval unit to generate the reference data by integrating reference values of a plurality of performance indicators for the wireless communication system, and
        set a result of compression and decompression of the reference data performed by the compression and decompression unit in the specific model.

4. The device of claim 3, wherein the model controller is further configured to set a plurality of groups corresponding to a plurality of features respectively, based on a reference value of each of the plurality of the performance indicators, the plurality of the features being related to the performance of the cell.

5. The device of claim 4, further comprising:
    a feature determination unit configured to detect a feature related to a degraded performance of the cell among the plurality of the features by using the third data.

6. The device of claim 5, wherein the feature determination unit includes:
    a plurality of detectors corresponding to the set plurality of the groups respectively; and
    a feature determinator configured to determine the feature related to the degraded performance of the cell based on result values outputted from the plurality of the detectors.

7. The device of claim 6, wherein the feature determinator is further configured to determine the feature related to the degraded performance of the cell by applying a predetermined weight to each of the result values outputted from the plurality of detectors.

8. A method of a device for analyzing performance degradation of a cell in a wireless communication system, the method comprising:
    acquiring, from a cell, first data measured through wireless communication of the cell;
    acquiring second data by applying the first data to a specific model in which reference data related to a performance indicator of wireless communication is set; and
    determining whether a performance of the cell is degraded based on third data derived from a difference between the first data and the second data,
    wherein the second data is acquired by compressing and decompressing the first data based on the reference data.

9. The method of claim 8, wherein the determining of whether the performance of the cell is degraded includes:
    comparing the third data with a predetermined threshold; and
    determining the performance of the cell being degraded, in case that the third data is greater than the predetermined threshold.

10. The method of claim 8, further comprising:
    generating the reference data by integrating reference values of a plurality of performance indicators for the wireless communication; and
    setting a result of compression and decompression of the reference data performed by the compression and decompression unit in the specific model.

11. The method of claim 10, further comprising:
    setting a plurality of groups corresponding to a plurality of features respectively based on a reference value of each of the plurality of the performance indicators, the plurality of the features being related to the performance of the cell.

12. The method of claim 11, further comprising:
    detecting a feature related to the degraded performance of the cell among the plurality of the features by using the third data, in case that the performance of the cell is determined to be degraded.

13. The method of claim 12, wherein the detecting of the feature related to the degraded performance of the cell includes:
    inputting the third data to a plurality of detectors corresponding to the plurality of groups respectively; and
    determining the feature related to the degraded performance of the cell based on result values outputted from the plurality of the detectors.

14. The method of claim 13, further including:
    determining the feature related to the degraded performance of the cell by applying a predetermined weight to each of the result values outputted from the plurality of the detectors.

* * * * *